United States Patent [19]

Moore, Jr. et al.

[11] Patent Number: 5,049,984
[45] Date of Patent: Sep. 17, 1991

[54] MOTION PICTURE TELECINE BALANCED FOR NEGATIVE SCANNING

[75] Inventors: Leslie G. Moore, Jr., Webster; Glenn L. Kennel, Rochester, both of N.Y.

[73] Assignee: Eastman Kodak Company, Rochester, N.Y.

[21] Appl. No.: 406,407

[22] Filed: Sep. 12, 1989

[51] Int. Cl.$^5$ .............................................. H04N 9/11
[52] U.S. Cl. ...................................... 358/54; 358/214
[58] Field of Search ................ 358/54, 214, 219, 228, 358/302, 75, 80

[56] References Cited

U.S. PATENT DOCUMENTS

| | | |
|---|---|---|
| 3,552,288 | 1/1971 | Corley . |
| 4,009,489 | 2/1977 | Seer, Jr. . |
| 4,050,085 | 9/1977 | Prince et al. ........................ 358/228 |
| 4,272,780 | 6/1981 | Belmares-Sarafin et al. . |
| 4,355,325 | 10/1982 | Nakamura et al. . |
| 4,418,358 | 11/1983 | Poetsch et al. ...................... 358/54 |
| 4,527,189 | 7/1985 | Ooi et al. . |
| 4,589,766 | 5/1986 | Fursich et al. . |
| 4,666,307 | 5/1989 | Matsumoto et al. . |
| 4,703,360 | 10/1987 | Shor . |
| 4,755,956 | 7/1988 | Porawski ............................. 358/54 |
| 4,812,879 | 3/1989 | Suzuki ................................. 358/80 |

OTHER PUBLICATIONS

"The Interface of Color Negative Film and Telecine," by Karel Staes & W. Markie, SMPTE Journal, Mar. 1983, pp. 303-307, described in the specification beginning line 10 on p. 3.

"FDL60-an Advanced Film Scanning System," by Dieter Poetsch, SMPTE Journal, Mar. 1984, pp. 216-227-described in the specification line 14 on p. 3.

"Noise in Film-to-Video Transfers," S. J. Powell et al., SMPTE Journal, Jan. 1987, pp. 16-27.

Search Report from European Patent Office.

*Primary Examiner*—James J. Groody
*Assistant Examiner*—Kim Yen Vu
*Attorney, Agent, or Firm*—David M. Woods

[57] ABSTRACT

A motion picture telecine scanner interposes a motion picture negative or print film (10) in an optical light path (12) between a light source (14) and a pickup stage (16) that develops a plurality of separate color output signals (R, G, B). By balancing the scanner so that the pickup stage provides substantially equivalent output levels in the respective colors for color transmissions substantially equivalent to like transmissions through the base density of a negative film, substantial signal-to-noise performance is realized during negative scanning. The base density is provided during a calibration mode by an optical filter (44) that is inserted into the light path with the motion picture film removed. In addition, the optical filter (44) is kept in the light path (12) during motion picture print scanning without any loss in signal-to-noise performance.

26 Claims, 1 Drawing Sheet

MOTION PICTURE TELECINE BALANCED FOR NEGATIVE SCANNING

BACKGROUND OF THE INVENTION

1. Field of the Invention

This invention pertains to the conversion of picture information on a motion picture film into a video signal and, more particularly, to a film scanning apparatus commonly known as a telecine scanner, which is used for playback of a motion picture film for television production and programming.

2. Background Art

A telecine scanner is ordinarily balanced "open gate" prior to scanning a motion picture film. This requires that the telecine scanner be adjusted so that when there is no film or filters in the light path from the light source through the film gate of the scanner to the image pickup devices, the red, green and blue video signal outputs are of equal amplitude. The equal signal amplitudes define a reference level corresponding to white light input, or some equivalent to white light input. Ordinarily the gain controls of the video amplifiers coupled to the image pickup devices are adjusted to produce such equal amplitudes, which are sometimes referred to as "100% video" output levels.

"Open gate" balancing is especially adapted for motion picture print film, since equal amounts of the positive-reading density information in the film will thereafter affect light transmission equally in each color. Motion picture print film, moreover, has been traditionally preferred for telecine scanning because positive prints, besides being readily available, are already color balanced for direct viewing and require fewer color corrections than a negative film. However, the making of a positive film print from the original negative film requires at least one extra processing step, which results in some degradation of the image as well as color saturation of the resulting print relative to the negative.

It would, consequently, be desirable to use a negative film . . . as well as a positive film . . . directly in a telecine scanner. A direct substitution of a negative film for a positive film is ordinarily unpromising since a negative film has an inherent base density that provides unequal transmission for like components of red, green, and blue light input to the negative film. The base density includes, in the case of negative film, the density of unexposed areas of the film, including the densities of the support and suspending gelatin, the fog density produced on development without exposure, and the unequal densities in red, green, and blue due to the inherent color mask used in a negative film to cancel unwanted dye absorption. This overall unequal density distribution becomes the point from which net densities produced by exposure and development are measured. The base density (also called the minimum density or "D-min.") of a negative film, for example, is about 0.3 units in red, 0.6 units in green and 0.9 units in blue. Such a typical negative material, therefore, blocks light transmission by about 50% in red, 75% in green and 88% in blue--without any image information yet in the film. The penalty for balancing a telecine scanner "open gate" is thus taken out in signal to noise for negative film, that is, signal to noise performance is reduced by a factor of 2 in red, by 4 in green, and by 8 in blue when scanning a negative film. This is clearly unacceptable.

Prior art attempts to correct for this imbalance generally depend upon either equalization of the light transmission of the negative film in red, green, and blue by adding filters into the light path (see, for example, U.S. Pat. No. 4,009,489), or by electronic matrixing of the red, green, and blue signals (see "The Interface of Color Negative Film and Telecine," by Karel Staes and Walter Markie, *SMPTE Journal*, March 1983, pp. 303-307), or by some combination of both (see "FDL60-An Advanced Film Scanning System," by Dieter Poetsch, *SMPTE Journal*, March 1984, pp. 216-227). Color equalization filters are inserted into the light path during film scanning so as to reduce red and green light transmission to match the blue light transmission of the negative film. When this method is utilized for a typical negative film, the video output signal amplitude is greatly reduced from its original "100% video" level. In order to restore the level needed for video processing, the gain of the image pickup amplifiers is uniformly increased, thus raising the typical noise level in the output signal. Alternatively, if optical equalization filters are not used, the individual gains of the image pickup amplifiers must be increased by different amounts, also increasing noise.

In U.S. Pat. No. 4,009,489, the output video signals are balanced for negative scanning by inserting optical equalization filters into the light path that optically match the red image light output to the green image light output. Then the electrical gain of only the blue light channel is increased in order to balance the output video signals. A "100% video" level is then restored by increasing the illumination. A related technique was disclosed in the Poetsch article (*SMPTE Journal*. March 1984). On changeover to negative film scanning (from positive print scanning), a cyan correction filter is inserted into the light path to correct for the orange mask in negative film. The black-and-white levels of the RGB signals are then adjusted for different negative materials.

Apart from the problem of handling the base density of negative film, a telecine scanner has to process films which are not primarily designed for the spectral sensitivities of its pickup devices, sometimes using imperfect light sources and less than ideal receptors. Electronic masking is used to correct for these factors. In the Poetsch article, a switchable RGB matrix provides the choice of two positions for positive film material and negative film material. Electronic masking oftentimes also attempts to correct for the mask dyes it "sees" in negative film. In the Staes and Markie article (*SMPTE Journal*, March, 1983), special matrix coefficients are developed to further eliminate the film mask.

Conventional telecine scanners thus treat negative scanning as an adjunct of positive scanning. Correction is attempted by either increasing the gain of the preamplifier section (with or without correction filters added) or by increasing the amount of electronic matrixing, or by both. Merely increasing gain inevitably reduces the signal in relation to noise. More matrixing means more signal contribution in each color channel from the other color channels, i.e., more cross-channel "noise". It is clear that color negative motion picture film is not currently processed in the most effective way in a telecine scanner.

SUMMARY OF THE INVENTION

The orientation in the prior art is to set up the telecine scanner for print material, i.e., provide "100% video" output level for "open gate" operation, and then make whatever adjustments are necessary when scanning negative material. This invention takes the opposite approach, that is, to balance the telecine scanner for negative material in the first instance. Instead of providing a correction filter during negative film scanning, the telecine scanner is balanced for color density substantially equivalent to the base density of a negative material. Balancing is completed during a calibration mode by inserting a minimum base density filter into the gate and bringing, the red, green, and blue output signals to substantially equivalent levels, i.e., levels corresponding to a "100% video" output level as produced by a nominally white light input.

Inasmuch as the negative film materials always have a characteristic base density (i.e., "D-min" density), the negative film can be thereafter considered to provide its own "correction" filter. If the telecine scanner is set up to provide a "100% video" output level on negative base density, then the telecine scanner is effectively operated "open gate" for negative film without the noise degradation commonly due to excessive, but heretofore necessary, "additional" filtering (i.e., additional to mask density) coupled with boosted gain in the output amplifiers.

Moreover, balancing the telecine scanner with base density in the gate has a surprising advantage in connection with print scanning. Recalling that in the prior art signal-to-noise performance is sacrificed for negative scanning in relation to print scanning, no such tradeoff is required by practice of the invention. By calibrating the telecine for maximum signal-to-noise output with base density in the light path for negative scanning, the same "100% video" level can be obtained for print scanning merely by scanning print material with the base density filter in the optical path. This means the changeover from negative to print scanning is a simple matter of inserting one filter . . . rather than changing gain as well as one or more equalization filters . . . without sacrificing signal-to-noise performance.

Accordingly, telecine apparatus is herewith described and claimed that processes either color motion picture negative or print film in a scanner which interposes the film in an optical light path between a light source and a pickup stage that develops a plurality of separate color output signals. The invention is characterized by having the pickup stage provide substantially equivalent output levels in the respective colors for color transmissions through the film substantially equivalent to transmissions through the base density of a negative film. Such base density is further embodied in an optical filter that is selectively inserted into the optical light path for print scanning to maintain substantial equivalence of the output levels whether scanning negative or print film. During a calibration mode, the same optical filter is used to establish initial balance of the separate output signals.

BRIEF DESCRIPTION OF THE DRAWING

The invention will be described in relation to the Figure, in which a telecine utilizing a base density balance according to the invention is shown.

DESCRIPTION OF THE PREFERRED EMBODIMENT

Figure 1:
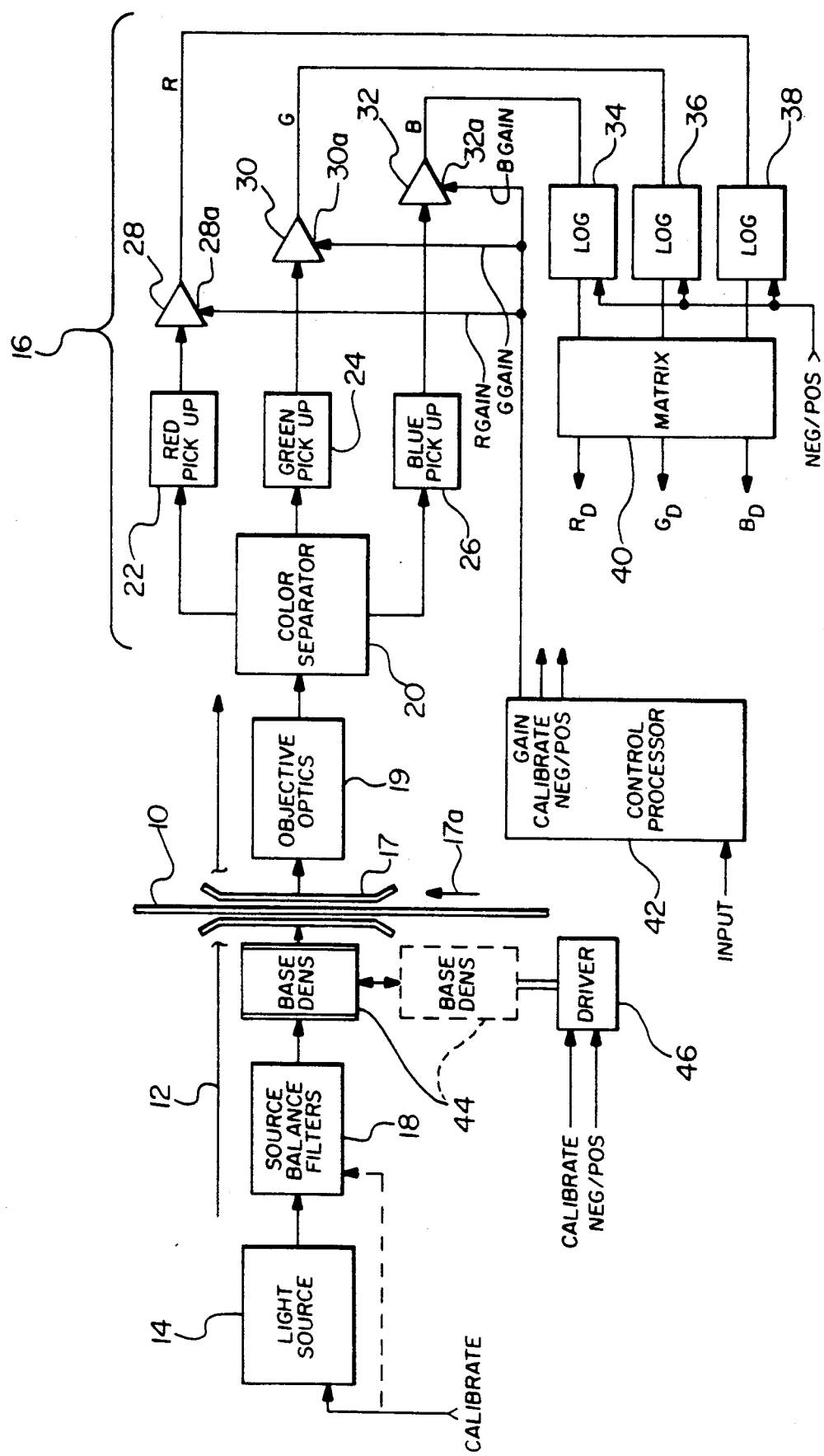

A telecine scanner as shown in the Figure includes a motion picture film 10 interposed in an optical light path 12 (shown optically off-center for clarity) between a light source 14 and a pickup stage 16. The film 10 is constrained within a film gate 17 for lineal movement as shown by an arrow 17a. Red, green, and blue color signals R, G, B are generated by the pickup stage 16 in general correspondence to the red, green, and blue image content of the light exiting the film 10. The motion picture film 10 may be a negative or a positive (print) film. As heretofore explained, white light transmission through a negative material is unequal for red, green, and blue colors because of its inherent dye mask. A basic objective of the invention is to correct for these unequal transmissions in a manner that does not diminish the signal-to-noise performance of the system, whether scanning negative or print film. One consequence of this objective is that practice of the invention, as will be seen, provides the equivalent of white light input as seen by the image information of the motion picture film 10, whether negative or positive.

Inasmuch as the base density of a negative motion picture film 10 is on the order of 0.3 units in red, 0.6 units in green, and 0.9 units in blue, it is helpful if the light source 14 produces a favorable ratio of blue to red (and green) energy. For example, a xenon continuous arc source produces more blue energy than an ordinary tungsten source. (Alternatively, one or a plurality of metal halide or tungsten lamps can be used to provide excess input optical energy such that red and green light can be subsequently deemphasized relative to blue light.) A set of source balance filters 18 "tunes" the output of the light source 14 and further helps to produce a light beam weighted toward blue, giving the light at this point a distinct cyan appearance. The light beam is directed through an aperture (not shown) in the film gate 17 and is modulated by the cyan, yellow, and magenta dye records in the film 10. The modulated beam is directed to the pickup section 16 by an objective optics section 19.

The pickup section 16 includes a color separator 20, such as a beamsplitter, and a plurality of pickup devices 22, 24, and 26--one each for red, green, and blue light respectively. The pickup devices are conventional photosensitive elements, such as phototubes or charge-coupled devices. Charge-coupled devices (CCDs) are typically preferred for modern telecines because they require little maintenance and adjustment and have a long life. The output signals of the pickup devices are applied to respective gain-controlled preamplifiers 28, 30, and 32. Gain factors RGAIN, GGAIN, and BGAIN are applied to respective gain terminals 28a, 30a, and 32b for controlling the signal gains in the red, green, and blue channels.

The R, G, B output signals of the pickup section 16 are applied to respective logarithmic amplification and gamma inversion stages 34, 36 and 38, in which the input signals are logged into density space for subsequent processing. In addition, red, green, and blue signals for a negative film are gamma inverted for correct tone scale reproduction in a television display. Color balance adjustments in each color channel are made by adjusting the log amp portions of the stages 34, 36, and 38. The reciprocal operation of gamma inversion is implemented (for a negative film) by the condition of a control line NEG/POS. The log outputs of the stages 34, 36, and 38 are applied to a conventional electronic matrix 40, which operates in density space to correct for deficiencies in the light source and in the spectral mismatch between the scanning light, the dye sensitivities of the motion picture film 10, and the spectral sensitivity of the red, green, and blue pickups 22, 24, and 26. Although not shown, the matrix 40 may be switchable for different types of film and may be connected to a "joystick" or like controller for custom corrections. The video output of the telecine scanner may be provided by conventional processing (not shown) of the output signals $R_D$, $G_D$, and $B_D$ (in density space) of the matrix 40.

A control processor 42 receives external input—for example, from an operator—and provides the gain factors to the preamplifiers 28, 30, and 32 and the NEG/POS selection input to the stages 34, 36, and 38. The control processor 42 also responds to external input to put the telecine into a calibration mode, during which the light source 14, and/or the source balance filters 18 and/or the preamplifier gains RGAIN, GGAIN, and BGAIN may be adjusted. A "calibrate" line is shown connected to the light source 14 to indicate that the intensity of the light source 14 may be adjusted during the calibration mode of operation. (Alternatively, as disclosed in U.S. Pat. No. 4,009,489, a variable neutral density disk (not shown here) can be placed in the light path to regulate intensity.) The broken-line connection to the source balance filters 18 indicates that filters may be removed or added during the calibration mode.

During the calibration mode, a base density (D-MIN) filter 44 is inserted into the light path 12 between the light source 14 and the pickup section 16 (with the motion picture film 10 removed from the light path 12). This may be done manually or, as shown in the Figure, by appropriately triggering a solenoid driver 46 with the calibrate and NEG/POS signals from the control processor 12. The filter 44 provides a color density substantially equivalent to the minimum base density of a negative motion picture film, that is, a density substantially equivalent to the mask density plus the residual minimum density of the negative material due to fog and the structure of the materials. With the filter 44 in the light path 12, the telecine scanner is adjusted so that the output signals R, G, and B from the pickup stage 16 are of equal amplitude. Ordinarily this adjustment is made with white light, or some close approximation thereof, incident upon the film gate 17. Preferably, the combination of the light source 14, the source balance filters 18, and the base density filter 44 provides substantially white light upon the film gate 17 of such intensity and spectral content that few remaining adjustments are needed. Accordingly, the remaining balance can be achieved in several ways, as follows. The light source 14 can be modified, or changed, to emphasize more light, or light richer in the colors for which there is greater density in the filter 44. Alternatively, or in addition, the source balance filters 18 can be adjusted to "trim" the incoming light and likewise correct for deficient spectral regions. Finally, the preamplifier gains RGAIN, GGAIN, and BGAIN can be adjusted to equalize the R, G, B output of the pickup stage 16 and to uniformly boost the R, G, B output levels to the "100% video" level of the system. In the preferred embodiment, since most of the required output level is obtained by tailoring the light source 14 and the source balance filters 18 to the negative material, the gain settings of the preamplifiers 28, 30, and 32 can be nominally set to about "1.0"; then a small gain adjustment would be used to "fine tune" an almost-equalized output level, since as heretofore observed gain adjustments have a direct effect on noise.

If the pickup devices 22, 24, and 26 are charge-coupled devices, it is preferable to produce a full well condition, or a substantially full well condition, with the base density filter 44 in the light path 12. This insures maximum signal-to-noise performance for negative material. Full well operation, or a substantial proportion thereof, is provided by supplying sufficient light energy to the pickup stage 16. Providing sufficient intensity in the light source 14, particularly in spectral regions rendered deficient by the mask density (i.e., blue), and providing appropriate "trim" with the source balance filters 18, generates sufficient light energy for substantially full well operation. For these reasons, the earlier-mention xenon light source is the preferred source. The slight imbalance in R, G, B output levels from the preamplifiers 28, 30, and 32 is then corrected by relatively small gain adjustments.

Although negative film scanning was the principal object of the invention, practice according to the invention has a significant concomitant advantage in connection with motion picture print scanning. The combination of the light source 14, the source balance filters 18, and the base density filter 44 provides substantially white light input to the film gate 17. Inasmuch as the base density filter 44 provides white light filtration to the film gate, and because the filter 44 simulates the inherent base density of the (negative) motion picture film 10, the filter 44 is redundant (and is removed from the light path 12) when negative film is scanned by the telecine. In effect, during negative scanning, it is as if the inherent base density of the negative film 10 substitutes for the filter 44 and the image density "sees", and modulates, the white light component of the input light. This means that when positive (print) motion picture film is scanned by the telecine, only the base density is lacking for white light operation. Consequently, the base density filter 44 is merely inserted into the optical path 12 to provide white light filtration to the image modulation in the positive material. Nothing is lost, however, in the way of signal-to-noise performance, since, e.g., the base density is present in both scanning modes for full well operation (with CCD pickup devices 22, 24, and 26).

Since the base density filter 44 is used over and over, it is necessary that it provide a stable calibration reference. The density of an actual photographic negative will likely change due to dye fading under the influence of high intensity light and heat. Consequently, it may be necessary to periodically replace the base density filter with a new one. It has been found preferable, however, to make the base density filter 44 from a dichroic filter material having a spectral transmission similar to the base density of a selected negative material. Unlike a negative material, a dichroic filter reflects, rather than absorbs, energy not transmitted; thus it is much more resistant to light intensity and heat and, consequently, can be used over a long period without fading. Given the spectral density curve shape required to simulate the base density of a negative material, which is common knowledge in the art, conventional techniques, materials, and methods may be used to produce the dichroic filter. Base densities are also known to vary from film batch to film batch and from manufacturer to manufacturer. The dichroic filter 44 is therefore designed to be lower in density than any real base density in order to prevent saturation of the red, green, and blue pickups 22, 24, and 26. Alternatively, as with the preferred use of CCD pickup devices, the pickups 22, 24, and 26 are set to approximately 90% full well operation during the calibration mode with the dichroic base density filter 44 in the light path 12. In practice the relatively minor spectral variation in base density from film to film can be accounted for with minor color balance adjustments to the log amplifier stages 34, 36, and 38.

The invention is particularly intended for use in a telecine scanner which produces red, green; and blue color signals. While not a direct part of the invention, the pickup stage 16 may also produce other signals from the film, such as a luminance or higher (than color) definition detail signal. Moreover, certain scanners might produce other types of chrominance color signals (such as color difference signals) instead of three separate red, green, and blue color signals. The principles of the invention apply, however, regardless of the exact composition of the color signal or the production of additional scanning signals. In the latter case, that is, when the color separator 20 produces an additional signal, it may prove desirable for the light input to the separator 20 to be weighted in a way beneficial to the development of the additional signal. Nonetheless, it is preferable for the light output from the separator 20 to be generally equalized, e.g., in red, green, and blue for full well operation.

The invention has been described in detail with particular reference to a presently preferred embodiment, but it will be understood that variations and modifications can be effected within the spirit and scope of the invention.

What is claimed is:

1. Telecine scanning apparatus for processing color motion picture negative and print film in a scanner which interposes said film in an optical light path between a light source and a pickup stage that develops a plurality of separate color output signals corresponding to respective color light transmissions through the film, characterized in that
   said pickup stage provides substantially equivalent output levels in the respective colors for respective color light transmissions through the film substantially equivalent to corresponding light transmissions through the base density of a negative film, said base density further embodied in an optical filter that is selectively inserted into the optical light path for print scanning to maintain substantial equivalence of the output levels whether scanning negative or print film.

2. Telecine apparatus as claimed in claim 1 in which the respective colors are red, green, and blue.

3. Telecine apparatus as claimed in claim 2 in which said pickup stage includes a plurality of charge-coupled device sensors and said light source fills the sensor charge wells to substantially equivalent charge levels in red, green, and blue for said red, green and blue color transmissions through the film that are substantially equivalent to said corresponding transmissions through the base density of a negative film.

4. Telecine apparatus as claimed in claim 2 in which said pickup stage includes red, green, and blue amplifying states with respectively adjustable gains and said gains ar set to provide substantially equivalent red, green, and blue output signals for said red, green and blue color transmissions through the film that are substantially equivalent to the said corresponding transmissions through the base density of a negative film.

5. Telecine apparatus as claimed in claim 3 further having a calibration mode and in which said optical filter is inserted into the light path during the calibration mode in order to balance the output levels in the respective colors.

6. Telecine apparatus as claimed in claim 4 having a calibration mode and in which said optical filter is inserted into the light path during the calibration mode in order to adjust the gains of the red, green, and blue output signals.

7. Telecine apparatus as claimed in claim 5 further including means operative during the calibration mode for varying the illumination output of the light source thereby adjusting the level of the charge wells.

8. Telecine apparatus as claimed in claim 1 wherein the light source output is weighted toward the blue end of the spectrum.

9. Telecine apparatus as claimed in claim 8 wherein the light source is a xenon source.

10. Telecine apparatus as claimed in claim 1 in which said optical filter is a dichroic filter providing light transmission similar to all or a substantial portion of the transmission through the minimum base density of a selected negative material.

11. Telecine apparatus as claimed in claim 10 in which the density of said dichroic filter is approximately 90% of said minimum base density of a selected negative material.

12. Telecine apparatus as claimed in claim 3 in which the charge-coupled device sensors are driven to equivalent charge well levels not exceeding full well capacity.

13. Telecine apparatus as claimed in claim 12 in which said equivalent charge well capacity is approximately 90% full well capacity.

14. Telecine scanning apparatus for processing color motion picture negative and print film in a scanner which interposes said film in an optical light path between a light source and a pickup stage that develops a plurality of separate color output signals corresponding to the picture information in the film, said scanner having a pre-scan calibration mode for balancing the color output signals and respective negative and positive scanning modes for scanning motion picture negative and print film, said apparatus characterized by
   optical filter means for approximating the minimum base density of a negative film;
   calibration means operative during the pre-scan calibration mode for providing substantially equivalent output levels from the pickup stage in the respective colors; and
   means for supporting said optical filter means in the optical light path during the calibration mode and during the print scanning mode, thereby balancing the scanner for negative film scanning.

15. Telecine apparatus as claimed in claim 14 in which the respective colors are red, green, and blue colors.

16. Telecine apparatus as claimed in claim 15 in which said pickup stage includes a plurality of charge-coupled device sensors.

17. Telecine apparatus as claimed in claim 16 in which said pickup stage includes red, green, and blue amplifying stages with respectively adjustable gains for providing substantially equivalent red, green, and blue output levels when the optical filter is supported in the light path during the calibration mode.

18. Telecine apparatus as claimed in claim 17 in which the illumination output of the light source brings the sensor charge wells to substantially equivalent charge levels in red, green, and blue when the optical filter is supported in the light path during the calibration mode.

19. Telecine apparatus as claimed in claim 18 wherein the light source output is weighted toward the blue end of the spectrum.

20. Telecine apparatus as claimed in claim 19 wherein the light source is a xenon source.

21. Telecine apparatus for processing negative or positive color film in a scanner which interposes said film in an optical light path between light source means and a pickup stage that develops red, green, and blue output signals corresponding to respective red, green, and blue light transmissions through the film, characterized in that said pickup stage provides substantially equivalent output levels in red, green, and blue for film densities substantially equivalent to the minimum base density of a negative film, said minimum base density simulated by an optical filter having a similar spectral density distribution or the transmission equivalent thereof, said minimum base density being provided in the light path by the inherent base density of the negative material during scanning of a negative film and by said optical filter during scanning of a positive film.

22. Telecine apparatus as claimed in claim 21 in which said light source means includes a light source and balance filters that together weight the spectral energy distribution of the illumination toward the one or more colors most absorbed by said base density.

23. Telecine apparatus as claimed in claim 22 in which said light source is a xenon lamp.

24. Telecine apparatus as claimed in claim 23 in which the illumination exiting said optical filter in the light path is substantially white light.

25. Telecine apparatus as claimed in claim 21 in which said pickup stage includes red, green, and blue amplifiers and means for separately adjusting the gains of said amplifiers so as to equalize the output levels in red, green, and blue.

26. A method of operating a motion picture telecine scanner that converts picture information on a color motion picture negative or print film into a plurality of separate color output signals corresponding to red, green, and blue color light transmissions through the film, said method comprising the steps of:

providing light illumination spectrally weighted toward the spectral content of the blue color light transmission;

directing the illumination toward a pickup stage that develops a plurality of separate output signals;

filtering the light beam with density equivalent to the minimum base density of a negative film;

adjusting the gain of the pickup stage for at least one of said separate color output signals developed from the filtered light beam, whereby the combination of the spectrally-weighted illumination and the adjusted gain provide output signals of substantially equal amplitude; and operating the telecine scanner with said minimum base density in the light beam when scanning a print film.

* * * * *